(12) United States Patent
Choi

(10) Patent No.: US 9,046,119 B2
(45) Date of Patent: Jun. 2, 2015

(54) TACKING NAIL OR TACKING PIN INCLUDING A CHARGING TIME INDICATING MEMBER FOR TACKER

(76) Inventor: Sang Ho Choi, Busan (KR)

( * ) Notice: Subject to any disclaimer, the term of this patent is extended or adjusted under 35 U.S.C. 154(b) by 0 days.

(21) Appl. No.: 14/123,592

(22) PCT Filed: May 18, 2012

(86) PCT No.: PCT/KR2012/003974
§ 371 (c)(1),
(2), (4) Date: Jan. 24, 2014

(87) PCT Pub. No.: WO2012/169734
PCT Pub. Date: Dec. 13, 2012

(65) Prior Publication Data
US 2014/0178151 A1    Jun. 26, 2014

(30) Foreign Application Priority Data

Jun. 10, 2011    (KR) .................. 10-2011-0056461
Jan. 4, 2012    (KR) .................. 10-2012-0000799
May 11, 2012    (KR) .................. 10-2012-0050408

(51) Int. Cl.
| | | |
|---|---|---|
| *F16B 15/08* | (2006.01) | |
| *F16B 1/00* | (2006.01) | |
| *B25C 1/00* | (2006.01) | |
| *B25C 5/16* | (2006.01) | |

(52) U.S. Cl.
CPC ............. *F16B 15/08* (2013.01); *F16B 1/0071* (2013.01); *B25C 1/005* (2013.01); *B25C 5/1689* (2013.01)

(58) Field of Classification Search
CPC ...... F16B 1/0071; B25C 1/005; B25C 5/1689
USPC ................................ 411/441–443, 8, 9, 903
IPC ........................................................ F16B 15/08
See application file for complete search history.

(56) References Cited

U.S. PATENT DOCUMENTS 5,069,340 A * 12/1991 Ernst et al. ..................... 206/347
5,772,379 A *  6/1998 Evensen ........................ 411/442

FOREIGN PATENT DOCUMENTS

EP    1022474 A1    7/2000
JP    8-159123 A    6/1996
(Continued)

OTHER PUBLICATIONS

WIPO, International Search Report, PCT/KR2012/003974, Nov. 23, 2012.
(Continued)

*Primary Examiner* — Gary Estremsky
(74) *Attorney, Agent, or Firm* — Park & Associates IP Law, P.C.

(57) ABSTRACT

The present invention provides a tacking nail connection body which allows a user to clearly recognize a stage for use of a tacking nail and a point in time for charging a tacker. In the tacking nail connection body (20) in which a plurality of tacking nails are arranged in a line and connected to each other, at least one tacking nail (21) disposed on a position biased from a central portion of the tacking nail connection body (20) toward one side includes an indicating member (30) attached along a length direction of a body part (21*b*) on a surface of the body part (21*b*) between a head part (21*a*) and a tip part (21*c*) of the tacking nail (21) and separated from the body part (21*b*) when the body part (21*b*) is stuck into lumber.

11 Claims, 12 Drawing Sheets

(a)          (b)

(56) References Cited

FOREIGN PATENT DOCUMENTS

| | | |
|---|---|---|
| JP | 11-108026 A | 4/1999 |
| JP | 2004-11773 A | 1/2004 |
| KR | 2001-0099348 A | 11/2001 |
| KR | 10-2005-0005776 A | 1/2005 |

OTHER PUBLICATIONS

EPO, European Search Report (EP 12797052), Jan. 20, 2015.

* cited by examiner (a)

(b)

(c)

(a)　　　　　　　　　　(b)

TACKING NAIL OR TACKING PIN INCLUDING A CHARGING TIME INDICATING MEMBER FOR TACKER

REFERENCE TO RELATED APPLICATIONS

This application is a U.S. National Phase application of International Patent Application PCT/KR2012/003974 filed on May 18, 2012, which designates the United States and claims priority of Korean Patent Application No. 10-2011-0056461 filed on Jun. 10, 2011, Korean Patent Application No. 10-2012-0000799 filed on Jan. 4, 2012, and Korean Patent Application No. 10-2012-0050408 filed on May 11, 2012, the disclosures of each of these applications being incorporated herein by reference in their entireties.

FIELD OF THE INVENTION

The present invention relates to a tacking nail and tacking pin of which charging time is recognizable, and more particularly, to a tacking nail and tacking pin that are provided with an indicating member indicating a point in time for recharging a tacker when almost consumed in the tacker.

BACKGROUND OF THE INVENTION

Generally, a tacker is a tool for driving a tacking nail or tacking pin into a given place by using a pressure of air or electromagnet, not by using a force of a human being. After the tacking nail or tacking pin is mounted into a magazine of the tacker, that is, it momentarily hits through an air cylinder or electromagnet and is stuck into concrete or lumber. As shown in FIG. 1, tacking nails 11 charged into the tacker are not fed individually to a magazine 4a, but fed thereto in a form of a tacking nail connection body 10 made by attaching the tacking nails 11 to each other in a line.

As shown in FIG. 2, the tacking nail connection body 10 is charged into the magazine 4a, and while in use, the tacking nails 11 of the tacking nail connection body 10 are separated individually from each other and move forward.

On the other hand, in case where the tacker 4 is used for lumber, if the tacking nails 11 are consumed in the magazine 4a of the tacker 4, a tacker user cannot accurately recognize a point in time of the consumption of the tacking nails 11. In more detail, the hitting rod of the tacker 4 moves forward in such a manner as to be more protruded than the front end of the tacker 4, and in this state, if the hitting rod strikes the head part of the tacking nail 11, the head part of the tacking nail 11 is stuck into lumber 5 to a lower depth than the surface of the lumber 5 and further covered with debris 5a of the lumber 5. This state is shown in FIG. 3.

Further, even in the state where the tacking nails 11 are used up in the magazine 4a, the hitting rod strikes the surface of the lumber 5, thus forming a given groove into the lumber 5. This makes the state where the tacking nail 11 is stuck into the lumber 5 and the state where no tacking nail 11 is stuck thereinto distinguished from each other on the outside.

Accordingly, unless it is carefully checked whether the tacking nail 11 is stuck into the portion of the lumber hit by the hitting rod of the tacker 4, a point in time when the tacking nails 11 are consumed may be recognized late, and further, scars may be unnecessarily formed on the lumber by the hitting rod of the tacker 4.

So as to solve the above-mentioned problems, as shown in FIG. 2, Korean Patent Publication No. 2001-0099348 discloses the tacker 4 having windows 4b formed on the magazine 4a to check a point in time of consumption of the tacking nails 4.

Unfortunately, however, the tacker 4 having such magazine 4a should be additionally purchased, or the structure of the existing tacker has to be appropriately changed. So as to recognize the consumption state of the tacking nails 11 through the windows 4b, further, a user has to carefully watch the state during working.

The above-mentioned problems caused in the conventional tacking nail connection body occur in the same manner as those in a conventional tacking pin connection body made by attaching a plurality of U-shaped tacking pins to each other.

SUMMARY OF THE INVENTION

Accordingly, the present invention has been made in view of the above-mentioned problems occurring in the prior art, and it is an object of the present invention to provide a tacking nail and tacking pin that are capable of allowing a user to clearly recognize a point in time for charging a tacker and that are useable for existing tackers.

To accomplish the above-mentioned object, according to a first aspect of the present invention, there is provided a tacking nail connection body including: a plurality of tacking nails arranged in a line and bonded to each other; and an indicating member attached to a surface of a body part formed between a head part and a tip part of each of one or more tacking nails disposed on a position biased from a central portion of the tacking nail connection body toward one side thereof along a longitudinal direction of the body part, the indicating member being separated from the body part when the body part is stuck into lumber.

To accomplish the above-mentioned object, according to a second aspect of the present invention, there is provided a tacking pin connection body including: a plurality of U-shaped tacking pins arranged in a line and tightly connected to each other, each tacking pin having leg parts parallel to each other and a head part connecting the leg parts with each other; and an indicating member attached extended from the surface of at least one leg part of the leg parts to the surface of the head part of each of one or more tacking pins disposed on a position biased from a central portion of the tacking pin connection body toward one side thereof, the indicating member being pushed by lumber and separated from the at least one leg part when the at least one leg part is stuck into the lumber.

To accomplish the above-mentioned object, according to a third aspect of the present invention, there is provided tacking nail including: a body part; a head part and a tip part formed on both ends of the body part; and an indicating member attached to the surface of the body part along a longitudinal direction of the body part, the indicating member being separated from the body part when the body part is stuck into lumber.

To accomplish the above-mentioned object, according to a fourth aspect of the present invention, there is provided a tacking pin including: leg parts parallel to each other; a head part connecting the leg parts with each other, thus forming the U-shaped tacking pin; and an indicating member attached extended from the surface of at least one leg part of the leg parts to the surface of the head part, the indicating member being pushed by lumber and separated from the at least one leg part when the at least one leg part is stuck into the lumber.

According to the present invention, the tacking nail and the tacking nail connection body can allow the indicating member to be exposed to the outside even when the head part is deeply stuck into the lumber through the hitting rod of the tacker, so that a user can clearly recognize a state of consumption of the tacking nail or a point in time for recharging the tacker.

Additionally, the tacking nail and the tacking nail connection body according to the present invention can solve the conventional problems that scars are unnecessarily formed on the surface of the lumber by the hitting rod of the tacker, and can perform the tacking operation, without any stop.

The above-mentioned effects in the tacking nail and the tacking nail connection body of the present invention are the same as those in the tacking pin and the tacking pin connection body of the present invention.

DETAILED DESCRIPTION OF THE INVENTION

Hereinafter, an explanation on a tacking nail connection body according to a first embodiment of the present invention will be in detail given with reference to the attached drawings.

Figure 4:
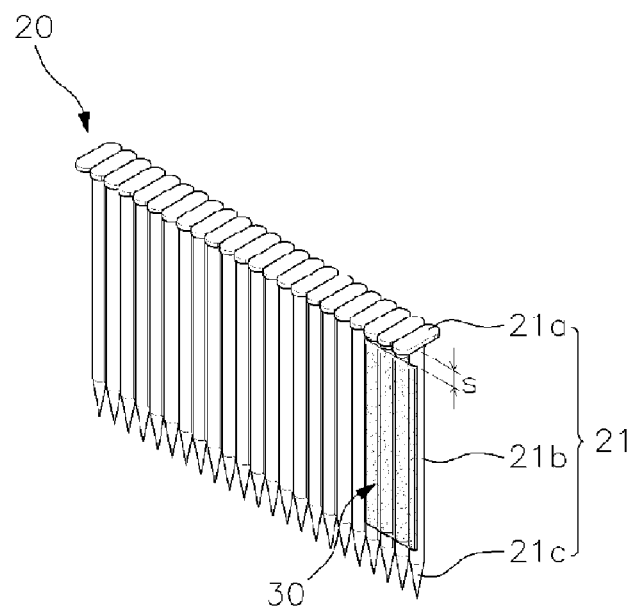
FIG. 4 is a perspective view showing a tacking nail connection body according to a first embodiment of the present invention.

FIG. 4 is a perspective view showing a tacking nail connection body according to a first embodiment of the present invention.

Referring to FIG. 4, a tacking nail connection body 20 is configured in which a plurality of tacking nails 21 is arranged tightly in a line and bonded to each other by means of an adhesive. According to the present invention, the tacking nail connection body 20 includes an indicating member 30 attached to one or more tacking nails 21 disposed on a position biased from a central portion of the tacking nail connection body 20 toward one side thereof. The indicating member 30 is attached to a surface of a body part 21$b$ formed between a head part 21$a$ and a tip part 21$c$ of each tacking nail 21 along a longitudinal direction of the body part 21$b$, so that the indicating member 30 is pushed from lumber and separated from the body part 21$b$ when the body part 21$b$ is stuck into the lumber, thus being exposed to the outside.

Each tacking nail 21 includes the head part 21$a$, the body part 21$b$ and the tip part 21$c$, and the plurality of tacking nails 21 is arranged in a line and bonded to each other by means of the adhesive or adhesive tape, thereby forming the tacking nail connection body 20 to be charged into a tacker.

While the tacking nail connection body 20 charged into the tacker is being used, the indicating member 30 is adapted to indicate a point in time for recharging the tacker with the tacking nails 21 when the tacking nails 21 charged into a magazine are almost used up.

The indicating member 30 is attached on a position biased from a central portion of the tacking nail connection body 20 formed of the plurality of tacking nails 21 connected to each other toward one side thereof. The indicating member 30 is not necessarily attached to the tacking nail 21 located at the side end of the tacking nail connection body 20, but it is preferably attached to the two to four tacking nails 21 inclusive of the tacking nail 21 located at the side end of the tacking nail connection body, so that the number of tacking nails 21 remaining thereinto can be accurately counted to allow a user to recognize a point in time for recharging the tacker with the tacking nails 21.

The indicating member 30 has given softness so that it can be bent. In the state where the indicating member 30 is attached to the surfaces of the tacking nails 21, if a pushing force in a lengthwise direction of the tacking nails 21 is applied to the indicating member 30, the indicating member 30 is separated from the surfaces of the tacking nails 21. The indicating member 30 is formed of a thin film made of a soft material easily bent.

In more detail, the indicating member 30 is made of any one selected from the group consisting of silicone rubber, silicone resin, vinyl resin, paper material, rubber material, silicone sealant, modified silicone sealant, polysulfide sealant, polyurethane sealant, butyl sealant, acrylic sealant, sealant formed of modified silicone resin having polyether containing a silyl group at the end, sealant formed of vinyl polymer containing a silyl functional group at the end, sealant containing vinyl monomer having a crosslinkable silyl group and epoxy resin, sealant cross-linking polymer having a silicone group and composition having tin (IV) compounds, and rubber putty material having acrylic emulsion as a main component.

Alternatively, the indicating member 30 may be made of photocurable resin containing oligomer, monomer, and photopolymerization initiator. The photocurable resin is a material cured by receiving ultraviolet light or electron beams, and accordingly, drying and curing can be accelerated by using solar energy during the manufacturing of the photocurable resin.

The oligomer constituting the photocurable resin is one selected from the group consisting of polyester acrylate, epoxy arcylate, urethane arcylate, polyether arcylate, silicone arcylate, aliphatic epoxy resin, glycidyl ether epoxy resin, vinyl ether, unsaturated polyester resin, and unsaturated acrylic resin.

Further, the monomer is one selected from the group consisting of monofunctional monomer, multifunctional monomer, phosphorous-containing monomer, epoxy monomer, vinyl ether, and cyclic ether.

Further, the photopolymerization initiator is one selected from the group consisting of benzoin ethers, amines, diazonium salts, iodine salts, sulfonium salts, and metallocene compounds.

The indicating member 30 is attached to the surface of the body part 21b formed between the head part 21a and the tip part 21c of each tacking nail 21 along the longitudinal direction of the body part 21b. Since the above-mentioned materials such as the silicone sealant are adherent in liquid states, the indicating member 30 of the liquid state is applied to the surface of the tacking nail 21 to form a thin film having a given thickness. If the thin film is applied to the tacking nails 21 adjacent to each other, as shown in FIG. 4, the thin film becomes solid by the viscosity of the material in the state of being attached to the surfaces of the tacking nails 21. Like this, if the thin film is formed on the surfaces of the tacking nails 21, it collides against lumber and is thus separated from the lumber to cause the actions as will be discussed later when the tacking nail 21 is stuck into the lumber.

In another attaching method of the indicating member 30, silicone rubber, a paper material, or a vinyl resin material that is not applied in liquid state is prepared in the form of a thin film, and the prepared thin film is attached to the surfaces of the body parts 21b of the tacking nails 21 by means of an adhesive. The adhesive includes glue having PVA components, starch or the like, and the indicating member 30 is attached to the tacking nails 21 at a degree of adhesion being separated from the body part 21b when the tacking nail is stuck into the lumber.

Figure 5:
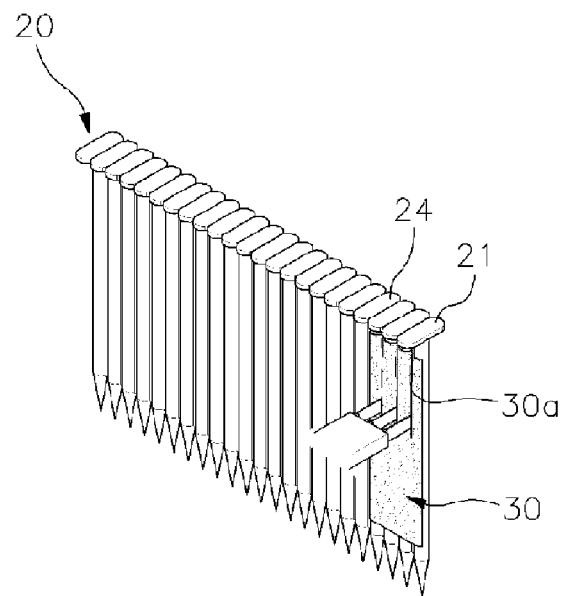
FIG. 5 is a perspective view showing the formation of the incisions into an indicating member of the tacking nail connection body according to the first embodiment of the present invention.

So as to allow the indicating member 30 to be attached to and separated individually from the tacking nails 21, as shown in FIG. 5, the indicating member 30 has incisions 30a formed between the neighboring tacking nails 21. Accordingly, when a hitting rod 45 of the tacker moves forward, the indicating member 30 attached to the forwardly moving tacking nail 21 is easily separated from the indicating member 30 attached to the surfaces of the remaining tacking nails 21 in the tacker.

If the incisions 30a for individually separating the indicating member 30 from each of the tacking nails 21 are not formed on the indicating member 30, however, the indicating member 30 attached to the tacking nails 21 may be torn out with no constant shape. In this case, however, at least one tacking nail 21 moves forward in the state where the indicating member 30 is attached thereto, thereby indicating a point in time for recharging the tacker with the tacking nails 21 to the user.

The indicating member 30 is made by adding red or blue colors clearly distinguished from the lumber to the material thereof, thereby preferably allowing the existence of the indicating member 30 to be easily recognized by the user. Further, the lowermost end of the indicating member 30 is formed thicker than the other end thereof and easily pushed from the lumber when the tacking nail 21 is stuck into the lumber, thereby allowing the indicating member 30 to be easily separated from the surface of each tacking nail 21.

Next, the operation of the tacking nail connection body 20 according to the first embodiment of the present invention will be described.

Figure 6:
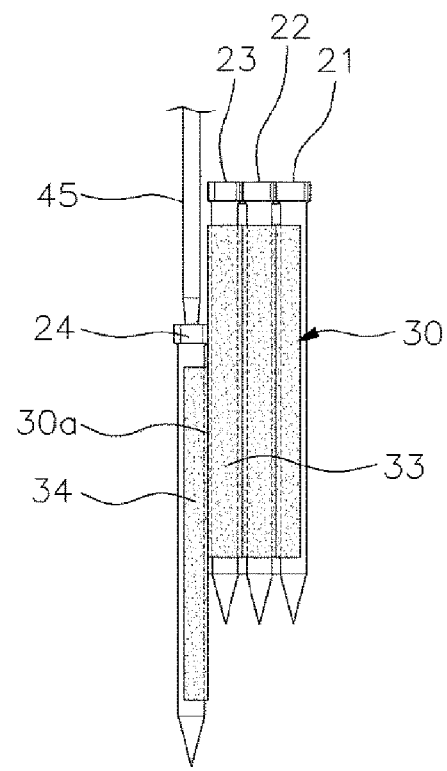
FIG. 6 is a sectional view showing the forwardly moving states of the tacking nails to which the indicating member is attached according to the first embodiment of the present invention.

FIG. 6 is a sectional view showing the state in which one tacking nail connection body 20 is charged and used, wherein the tacking nails 21 to which the indicating member 30 is not attached are used up and a tacking nail 24 to which the indicating member 30 is attached moves forward. An indicating member 34 attached to the surface of the forwardly moving tacking nail 24 is separated from an indicating member 33 attached to the neighboring tacking nail 23.

Figure 7:
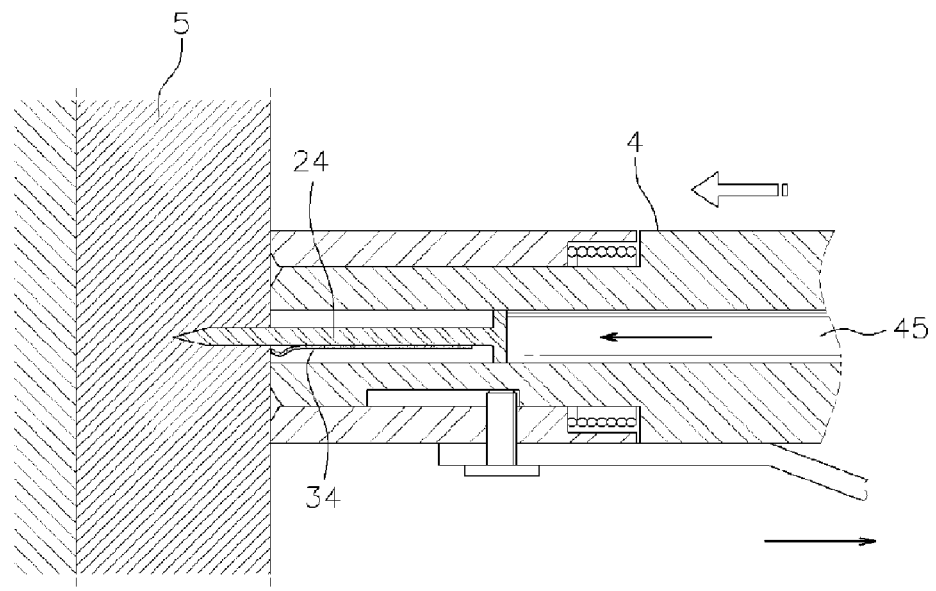
FIGS. 7 and 8 are sectional views showing the operating states of the tacking nail according to the first embodiment of the present invention.
Figure 8:
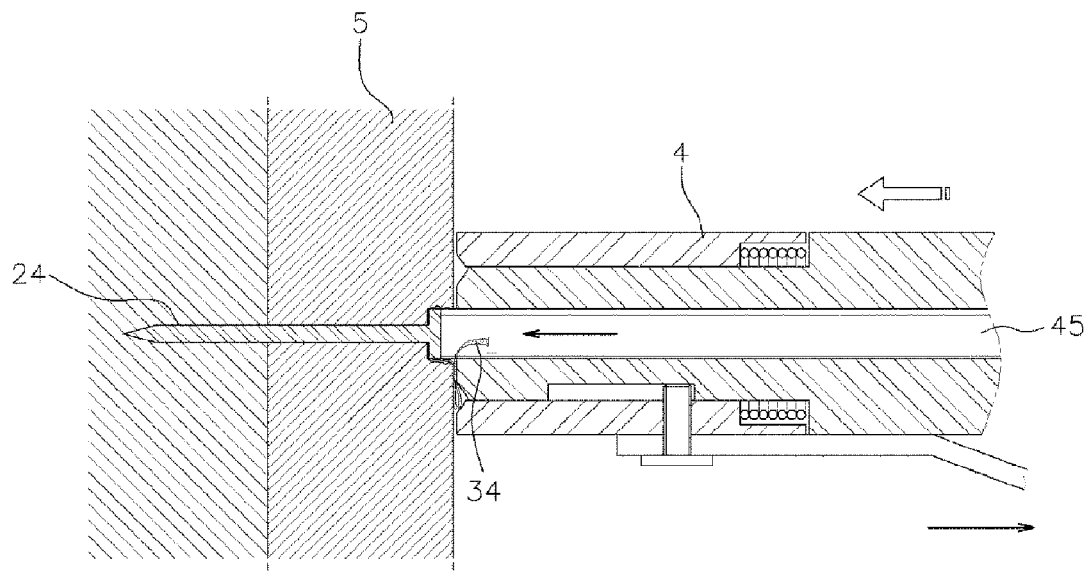

FIGS. 7 and 8 are sectional views showing the operating states of the tacking nail according to the first embodiment of the present invention.

Referring first to FIG. 7, if the tacking nail 24 is stuck into the lumber 5 to a given depth, the indicating member 34 attached to the surface of the body part of the tacking nail 24 receives the resistance of the lumber 5 and is thus not stuck into the lumber 5 together with the tacking nail 24. Accordingly, the indicating member 34 forcedly slides from the bottom side of the tacking nail 24 first contacted with the lumber 5 or starts to be separated therefrom.

After that, as shown in FIG. 8, the whole tacking nail 24 is stuck into the lumber 5 in a very short time. Therefore, the uppermost portion of the indicating member 34 attached to the tacking nail 24 is separated from the surface of the body part of the tacking nail 24, and the head part of the tacking nail 24 is stuck into the lumber 5, while pressing a portion of the indicating member 34. The portion of the indicating member 34 separated from the tacking nail 24 is disposed in the state of being compressed into the free space between the tacker 4 and the lumber 5, and the portion of the indicating member 34 pressed by the head part of the tacking nail 24 is disposed in the state of being fitted to the head part of the tacking nail 24 stuck into the lumber 5.

Figure 9:
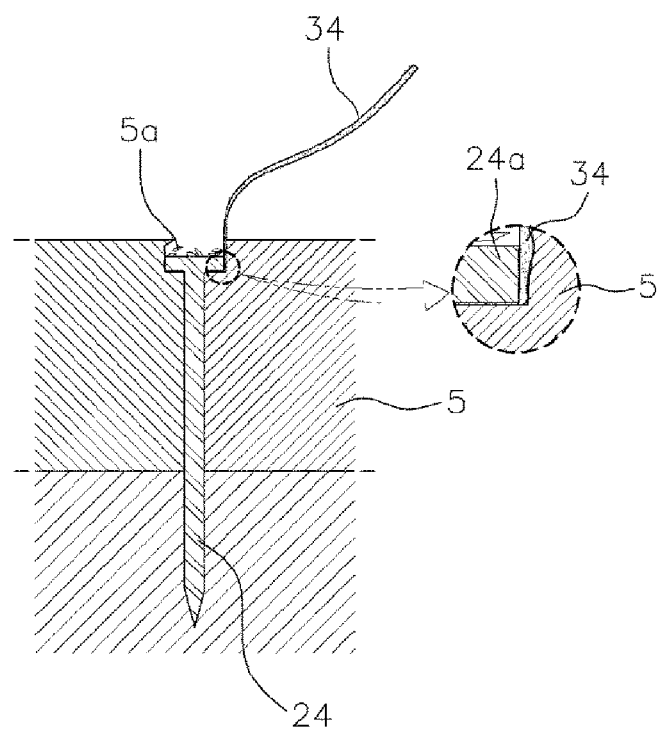
FIG. 9 is a sectional view showing the state after the tacking nail to which the indicating member is attached is stuck into lumber according to the first embodiment of the present invention.

FIG. 9 is a sectional view showing the state after the tacking nail 24 is stuck into the lumber 5. In this state, one end of the indicating member 34 is fixedly fitted between the head part 24a of the tacking nail 24 and the lumber 5, and the other end thereof is exposed protrudedly to the outside.

When the indicating member 34 exposed to the outside is recognized by the user, he or she recognizes a point in time for recharging the tacker 4 with the tacking nail connection body 20 and thus recharges the tacker 4 with the tacking nail connection body 20.

The indicating member 34 whose one end is fittedly to the head part 23a of the tacking nail 24 is pulled and drawn by the user, thereby organizing the state after the working.

Figure 10:
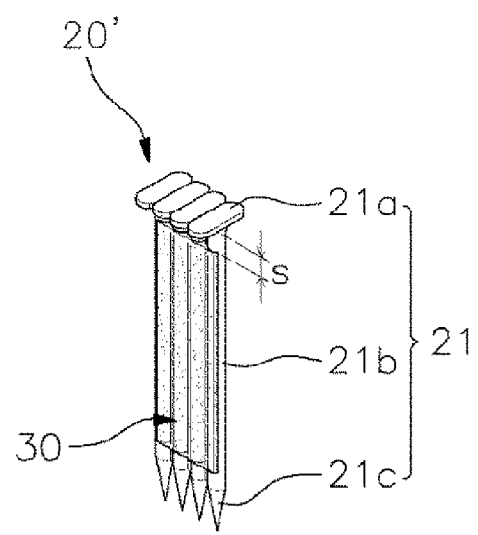
FIG. 10 is a perspective view showing a variation example of the tacking nail connection body according to the first embodiment of the present invention.

FIG. 10 is a perspective view showing a variation example of the tacking nail connection body according to the first embodiment of the present invention.

Referring to FIG. 10, a tacking nail connection body 20' is configured in which a plurality of tacking nails 21 is arranged in a line and bonded to each other and an indicating member 30 is attached to the whole tacking nail 21 constituting the tacking nail connection body 20'.

Figure 1:
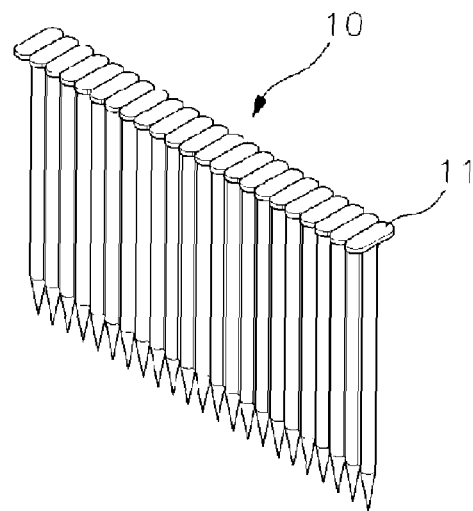
FIG. 1 is a perspective view showing a conventional tacking nail connection body.
Figure 2:
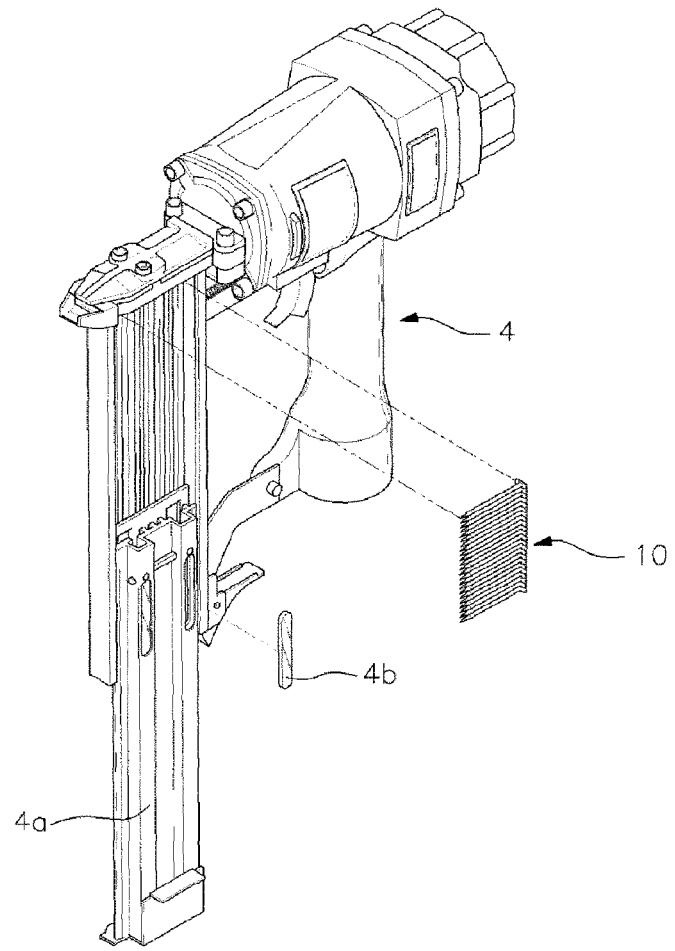
FIG. 2 is a perspective view showing a conventional tacker to which the conventional tacking nail connection body is coupled.
Figure 3:
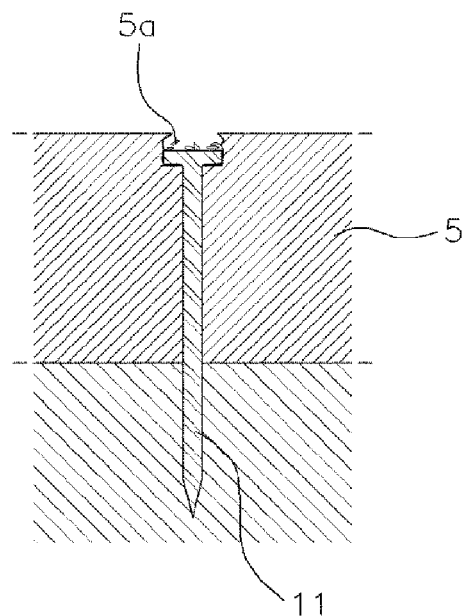
FIG. 3 is a sectional view showing the conventional tacking nail stuck into lumber.
Figure 11:
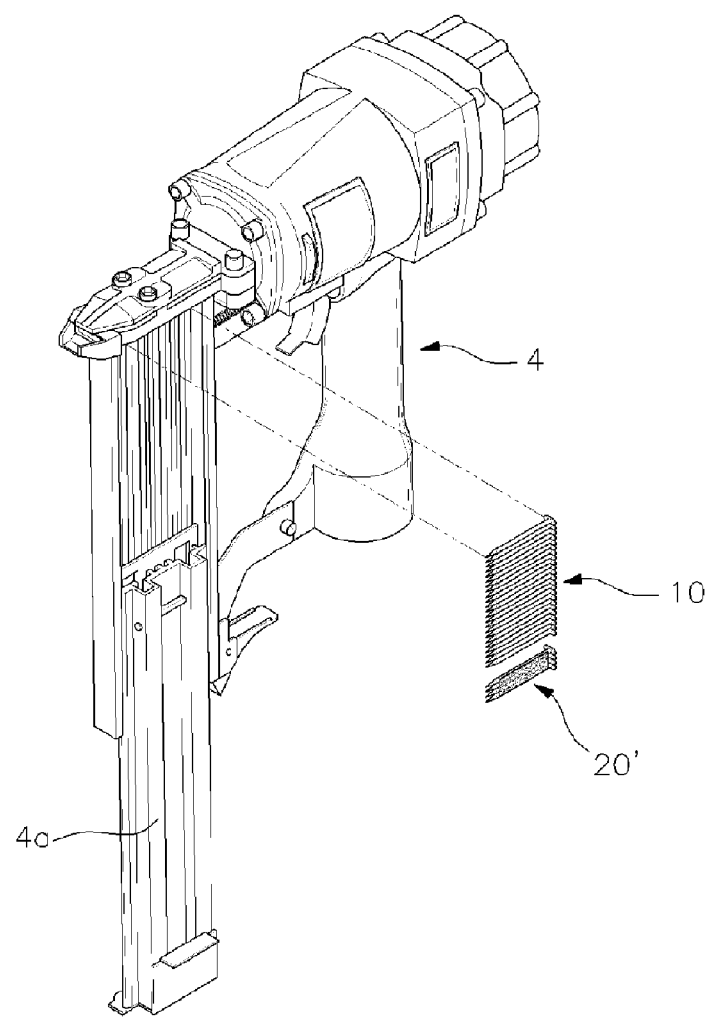
FIG. 11 is a perspective view showing the use state of the tacking nail connection body of FIG. 10.

FIG. 11 is a perspective view showing the use state of the tacking nail connection body 20' of FIG. 10. Referring to FIG. 11, when the tacking nails are charged into the magazine 4a of the tacker 4, the conventional tacking nail connection body 10 as shown in FIG. 1 is disposed on the upper side of the magazine 4a and the tacking nail connection body 20' as shown in FIG. 10 is disposed on the lower side thereof. Accordingly, after the tacking nail connection body 10 disposed on the upper side of the magazine 4a is used up, the tacking nail connection body 20' as shown in FIG. 10 is stuck into the lumber, so that the user can recognize the consumption state of the tacking nails through the indicating member 30 attached to the surfaces of the tacking nail connection body 20'.

The tacking nail connection body 20' as shown in FIG. 10 may be formed of a single tacking nail 24 to which the indicating member 34 is attached, not formed of the plurality of tacking nails 21. In this case, the single tacking nail 24 to which the indicating member 34 is attached is charged into the lowermost portion of the tacker 4 after the conventional tacking nail connection body 10 has been disposed on the upper portion thereof.

Figure 12:
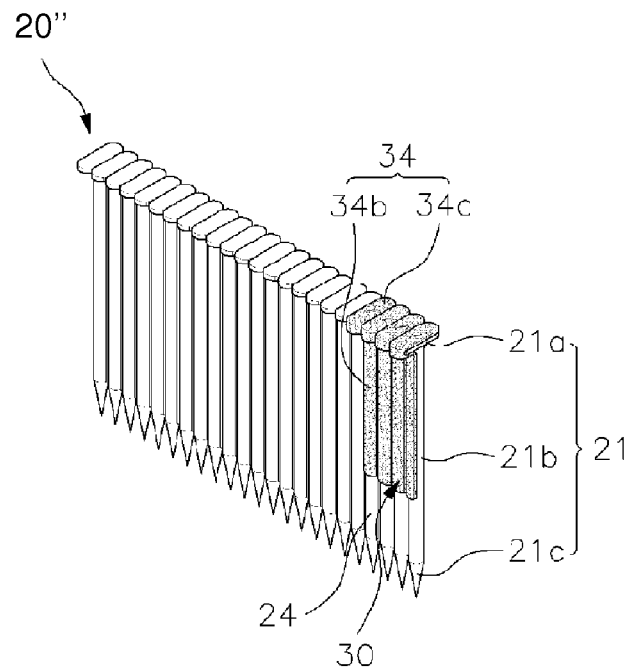
FIG. 12 is a perspective view showing another variation example of the tacking nail connection body according to the first embodiment of the present invention.

FIG. 12 is a perspective view showing another variation example of the tacking nail connection body according to the first embodiment of the present invention. That is, an indicating member 30 attached to a tacking nail connection body 20" is formed extended to the head parts 21a of the tacking nails 21.

Figure 13:
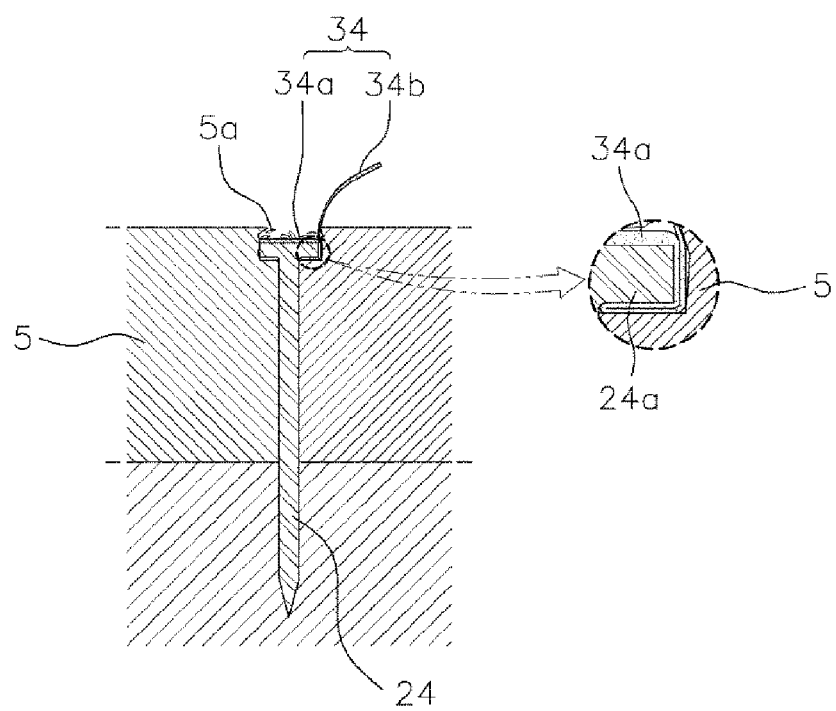
FIG. 13 is a sectional view showing the state after the tacking nail of the tacking nail connection body of FIG. 12 is stuck into lumber.

In this case, as shown in FIG. 13, after the tacking operation is completed, one portion 34a of the indicating member 34 attached to the head part 24a of the tacking nail 24 is maintained in the state of being attached thereto, and the other portion 34b of the indicating member 34 separated from the body part of the tacking nail 24 is exposed protrudedly to the outside of the lumber 5.

Figure 14:
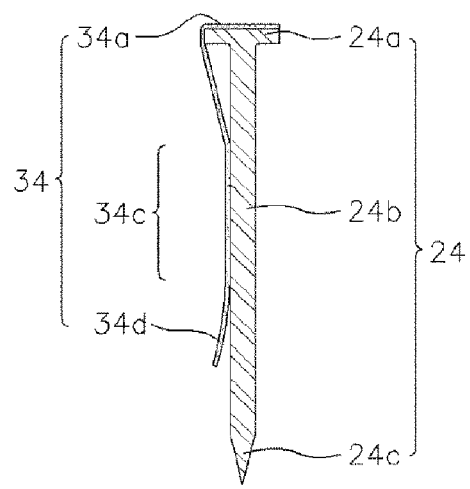
FIGS. 14A to 14C are sectional views showing various ways of attaching the indicating member to the tacking nail according to the first embodiment of the present invention.
Figure 14:
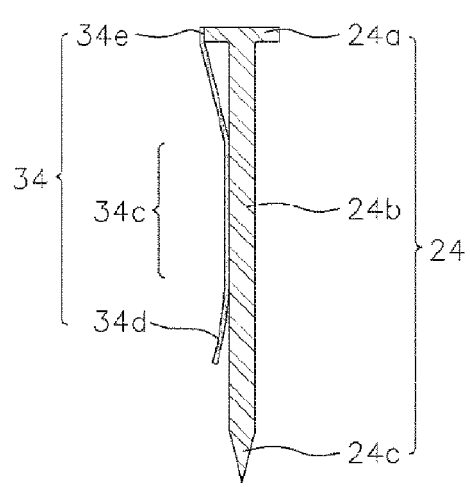
Figure 14:
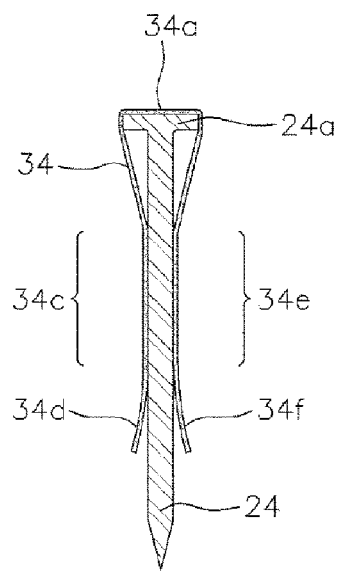

On the other hand, as shown in FIGS. 14A to 14C, the indicating member 34 may be attached in various shapes to the tacking nail 24.

In FIGS. 14A to 14C, a portion of the indicating member 34 is attached to the body part 24b of the tacking nail 24, and the lower end portion thereof is separated from the body part 24b. The bonding of the indicating member 34 to the tacking nail 24 is performed by means of an adhesive.

In more detail, in FIG. 14A, portions 34a and 34c of the indicating member 34 are attached to the top surface of the head part 24a and a portion of the body part 24b of the tacking nail 24, and the lower end portion 34d thereof is separated from the body part 24b. Since the lower end portion 34d of the indicating member 34 is separated from the body part 24b, the indicating member 34 can be more gently separated from the body part 24b.

In FIG. 14B, portions 34e and 34c of the indicating member 34 are attached to the side surface of the head part 24a and a portion of the body part 24b of the tacking nail 24.

In FIG. 14C, the indicating member 34 is attached to both sides of the tacking nail 24 in the same manner as that of FIG. 14A.

Next, a tacking pin connection body according to a second embodiment of the present invention will be explained.

Figure 15:
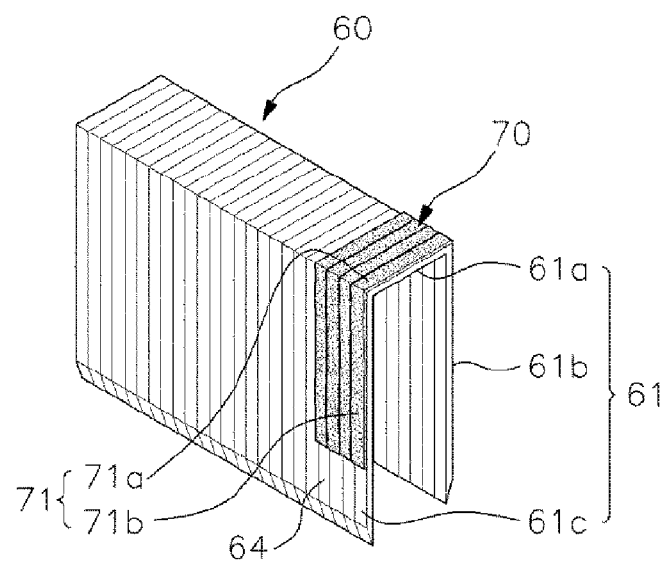
FIG. 15 is a perspective view showing a tacking pin connection body according to a second embodiment of the present invention.

In the second embodiment of the present invention, an indicating member 70 is attached to a tacking pin connection body 60 used for a tacker 4, and FIG. 15 shows the tacking pin connection body 60 according to the second embodiment of the present invention.

Referring to FIG. 15, each tacking pin 61 constituting the tacking pin connection body 60 includes leg parts 61b and 61c parallel to each other and a head part 61a connecting the leg parts 61b and 61c with each other. The tacking pin connection body 60 has a plurality of U-shaped tacking pins 61 bonded side by side to each other. Accordingly, as shown in FIG. 15, the tacking pin connection body 60 has a U-shaped section along the lengthwise direction thereof.

According to the second embodiment of the present invention, the tacking pin connection body 60 includes the indicating member 70 attached to one or more tacking pins 61 disposed on a position biased from a central portion of the tacking pin connection body 60 toward one side thereof.

The indicating member 70 is not necessarily attached to the tacking pin 61 located at the side end of the tacking pin connection body 20, but it is preferably attached to the two to four tacking pins 61 inclusive of the tacking pin 61 located at the side end of the tacking pin connection body 60, so that the number of tacking pins 21 remaining thereinto can be accurately counted to allow a user to recognize a point in time for recharging the tacker 4 with the tacking pins 61. The material of the indicating member 70 and the method for forming the indicating member 70 on the tacking pins 61 are the same as those in the first embodiment of the present invention.

On the other hand, the indicating member 70 is attached extended from the surface of at least one leg part 61c of the leg parts 61b and 61c to the surface of the head part 61a. That is, the indicating member 70 may be attached to the surface of one leg part 61c or to the surfaces of the two leg parts 61b and 61c.

Figure 16:
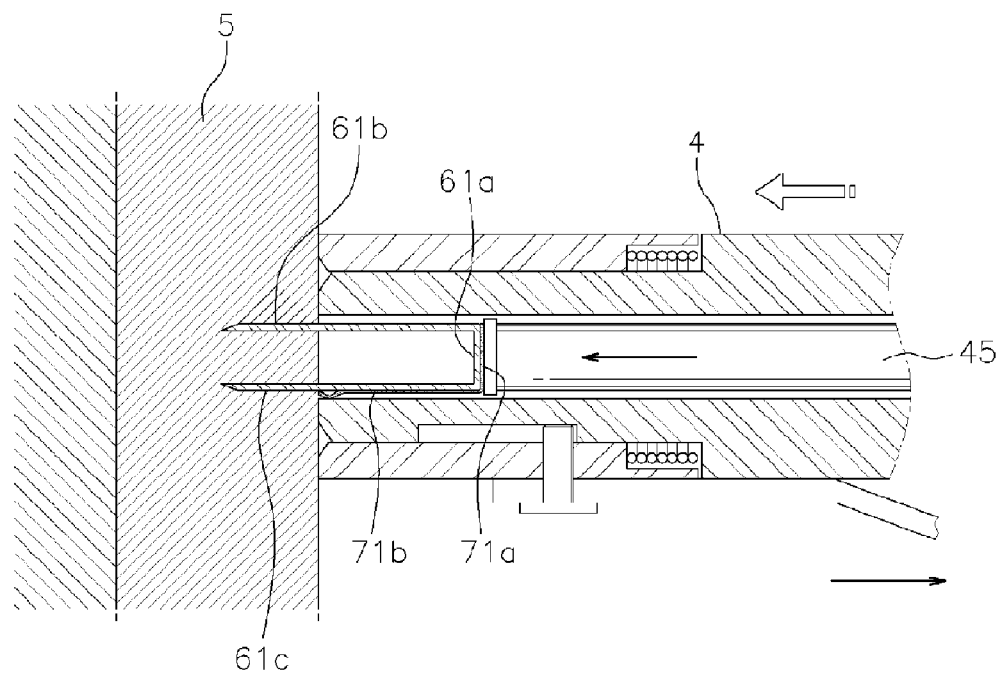
FIGS. 16 and 17 are sectional views showing the operating states of the tacking pin according to the second embodiment of the present invention.

FIG. 16 shows the tacking pin initially stuck into lumber. When the tacking pin 61 is stuck into the lumber, a portion 71b of the indicating member 70 collides against the surface of the lumber 5 and is separated from the leg part 61c of the tacking pin 60. At this time, as a portion 71a of the indicating member 70 attached to the head part 61a of the tacking pin 60 is pressed continuously by the hitting rod 45, the attached state is stably maintained.

Figure 17:
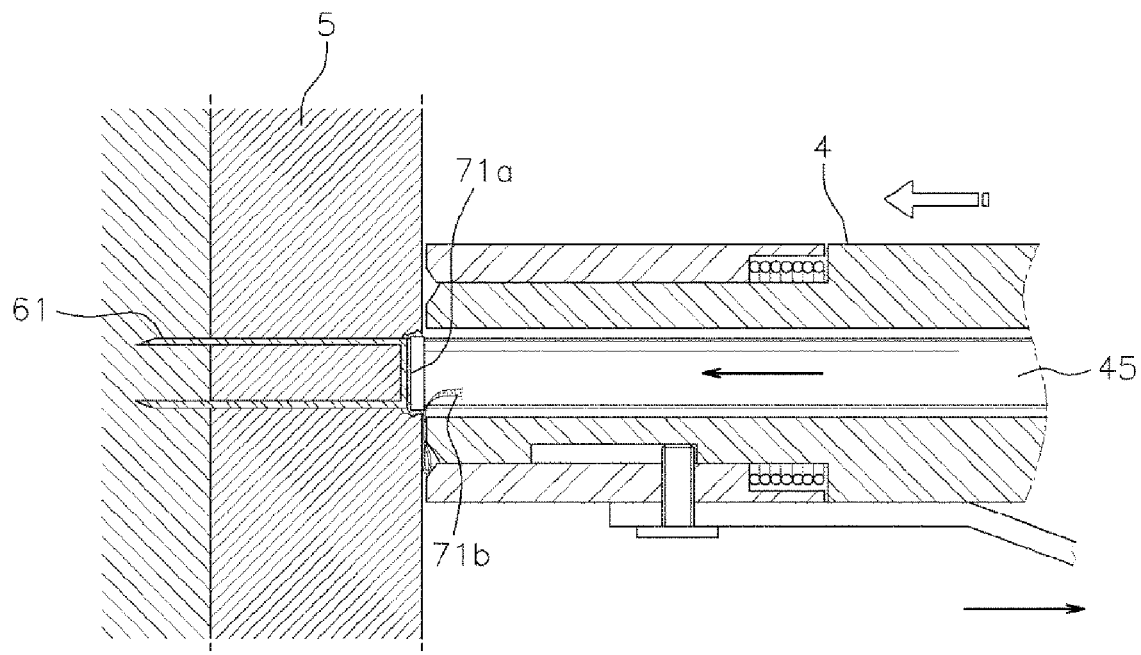

FIG. 17 shows the tacking pin completely stuck into lumber. After the tacking pin 61 is stuck into the lumber, in the state where the portion 71a of the indicating member 70 is attached to the head part 61a of the tacking pin 60, the portion 71b of the indicating member 70 separated from the tacking pin 61 is compressedly located at a space between the tacker 4 and the lumber 5.

Figure 18:
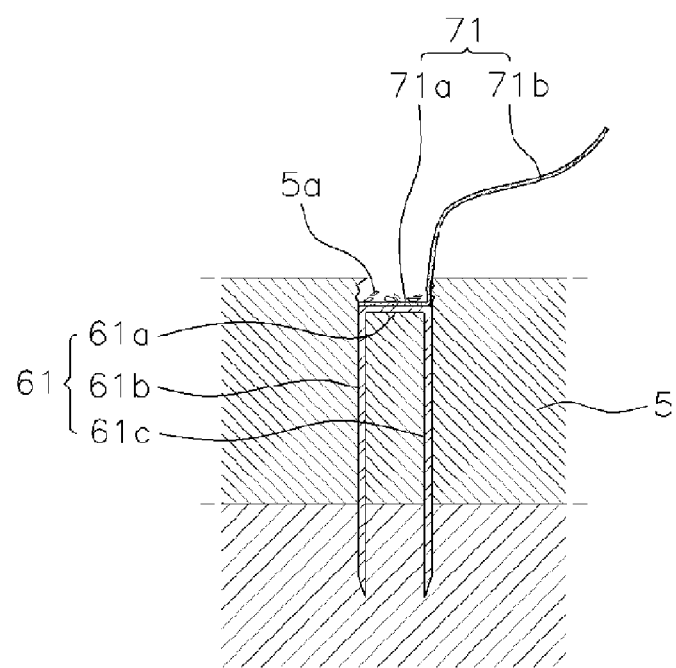
FIG. 18 is a sectional view showing the state after the tacking pin to which an indicating member is attached is stuck into lumber according to the second embodiment of the present invention.

After that, if the tacker 4 is separated from the lumber 5, as shown in FIG. 18, the portion 71a of the indicating member 70 is still attached to the head part 61a of the tacking pin 60, and the portion 71b of the indicating member 70 is exposed protrudedly to the outside. Accordingly, the consumption state of the tacking pins 61 can be easily recognized by the user.

Figure 19:
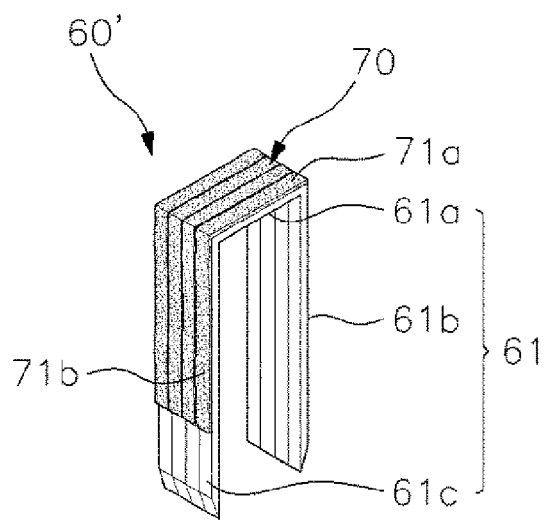
FIG. 19 is a perspective view showing a variation example of the tacking pin connection body according to the second embodiment of the present invention.

FIG. 19 is a perspective view showing a variation example of the tacking pin connection body according to the second embodiment of the present invention, wherein a plurality of tacking pins 61 is tightly bonded to each other in the same manner as that of FIG. 15, but the indicating member 70 is attached to the whole tacking pin 61 constituting the tacking pin connection body 60'.

A method for using the tacking pin connection body 60' is the same as that of FIG. 11, and of course, the tacking pin connection body 60' may be formed of a single tacking pin 61 to which the indicating member 71 is attached so that it is used in the same manner as in FIG. 11.

Figure 20:
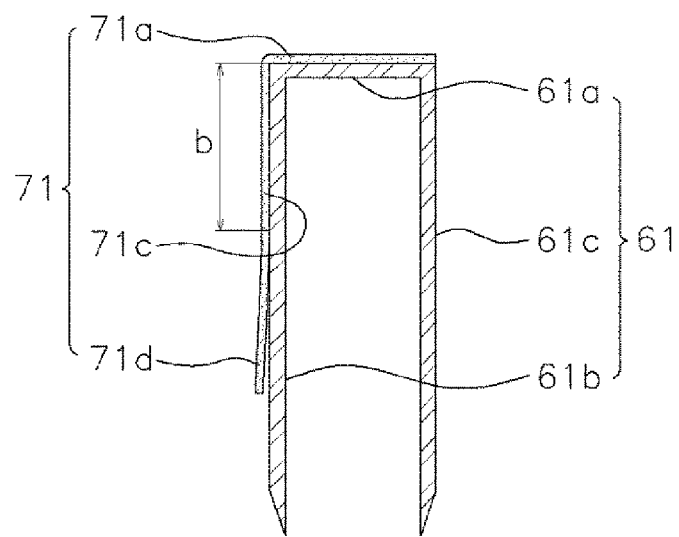
FIG. 20 is a sectional view showing another variation example of the tacking pin connection body according to the second embodiment of the present invention.

FIG. 20 shows another variation example of the tacking pin connection body 60 according to the second embodiment of the present invention, wherein a portion 71c of the indicating member 71 is attached to the surface of any one leg part 61b of the tacking pin 61 and a lower end portion 71d of the indicating member 71 is not attached to the tacking pin 61. When the indicating member 71 collides against the lumber 5, accordingly, it can be more gently separated from the leg part 61b of the tacking pin 61.

Figure 21:
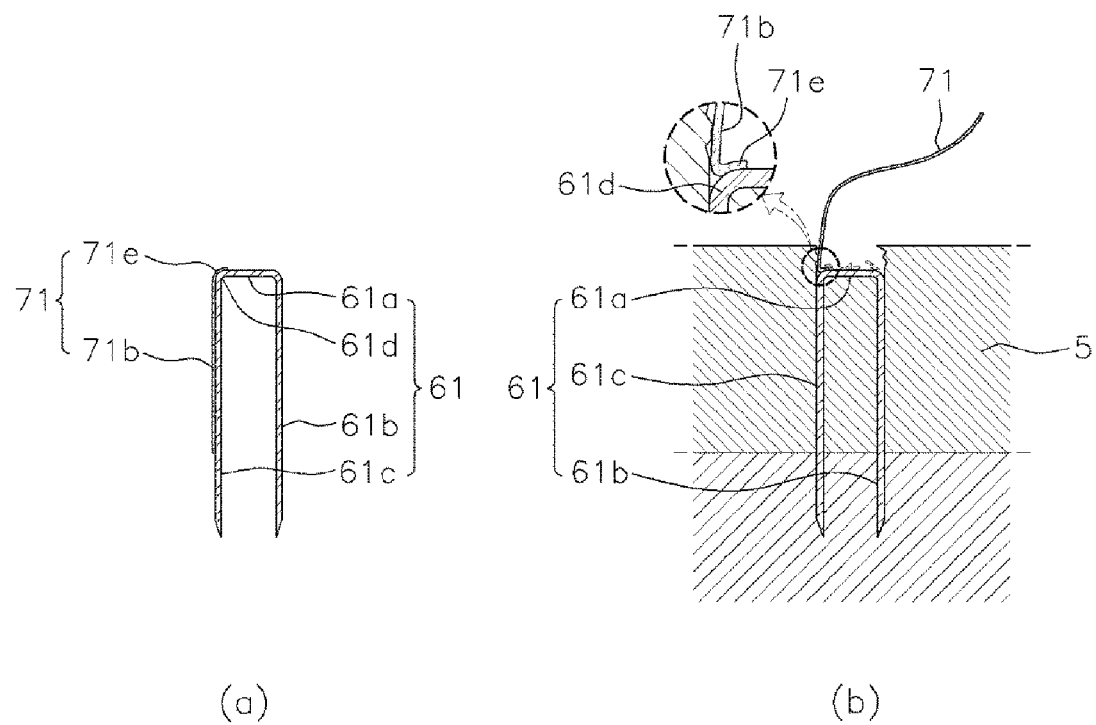
FIGS. 21A and 21B are sectional views showing yet another variation example of the tacking pin connection body according to the second embodiment of the present invention and the state after the tacking pin is stuck into lumber.

FIGS. 21A and 21B shows still another variation example of the tacking pin connection body 60 according to the second embodiment of the present invention, wherein the indicating member 71 is attached extended to a corner part 61d corresponding to the side end of the head part 61a from the lower end portion thereof, while being not attached to the whole surface of the head part 61a, as shown in FIG. 21A. In this case, the head part 61a includes the corner part 61d.

Even in this case, as shown in FIG. 21B, during tacking, the indicating member 71 separated from the surface of the leg part is exposed to the outside of the lumber, while a portion 71e of the indicating member 70 is being attached to the corner part 61d corresponding to the side end of the head part 61a.

Figure 22:
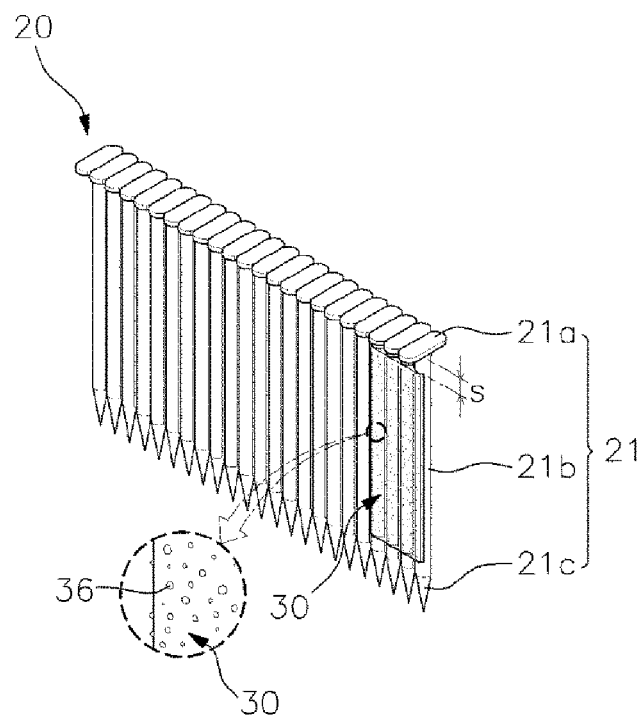
FIG. 22 is a perspective view showing solid particles protruded from the surface of the indicating member of the tacking nail connection body according to the present invention.

FIG. 22 is a perspective view showing solid particles protruded from the surface of the indicating member of the tacking nail connection body according to the present invention. The solid particles 36 are harder than the indicating member 30 and they are formed of sand particles, glass particles, stone powder, and gypsum powder. If the solid particles 36 are exposed to the surface of the indicating member 30, they make the surface of the indicating member 30 irregular, thereby increasing the frictional force of the indicating member 30 when the indicating member 30 collides against the lumber. Further, the solid particles 36 contained inside the indicating member 30 inhibit the indicating member 30 from conducting the expansion and contraction, so that it is hard for the indicating member 30 to be stuck into the lumber together with the tacking nail 21. In the process where the tacking nail 21 is stuck into the lumber, accordingly, the indicating member 30 can be more easily separated reliably from the surface of the tacking nail 21 and thus exposed to the outside of the lumber.

So as to contain the solid particles 36 in the indicating member 30, it is most preferable that the solid particles 36 be added and evenly mixed to the liquid material of the indicating member 30. The solid particles 36 added to the liquid material are uniformly distributed on the indicating member 30 in the process where the liquid material is applied and cured on the surfaces of the tacking nails 21, thus making the indicating member 30 and the solid particles 36 formed unitarily to each other.

In case where the indicating member is not liquid, the solid particles 36 are attached evenly on the surfaces of the tacking nails 21 by means of adhesive, thus making the indicating member 30 and the solid particles 36 formed unitarily to each other.

Of course, the solid particles 36 are contained in the indicating member 70 of the tacking pins 61.

According to the present invention, the tacking nail connection body and the tacking pin connection body can be usefully applied to the field of carpentry work for attaching lumber to a wall surface and for connecting lumber to lumber.

What is claimed is:

1. A tacking nail connection body comprising:
a plurality of tacking nails arranged in a line and bonded together; and
an indicating member attached to a surface of a body part between a head part and a tip part of one or more tacking nails on a position displaced laterally from a central portion of the tacking nail connection body toward one side thereof, the indicating member being separable from the body part by frictional force when an individual tacking nail having the indicating member attached is driven into a target object,
wherein the indicating member has solid particles unitarily applied thereto.

2. The tacking nail connection body according to claim 1, wherein the indicating member is made of any one selected from the group consisting of silicone rubber, silicone resin, vinyl resin, paper material, rubber material, silicone sealant, modified silicone sealant, polysulfide sealant, polyurethane sealant, butyl sealant, acrylic sealant, sealant formed of modified silicone resin having polyether containing silyl group at the end, sealant formed of vinyl polymer containing a silyl functional group at the end, sealant containing vinyl monomer having a crosslinkable silyl group and epoxy resin, sealant cross-linking polymer having a silicone group and composition having tin (IV) compounds, and rubber putty material having acrylic emulsion as a main component, and alternatively, the indicating member is made of photocurable resin containing oligomer, monomer, and photopolymerization initiator, the oligomer being one selected from the group consisting of polyester acrylate, epoxy arcylate, urethane arcylate, polyether arcylate, silicone arcylate, aliphatic epoxy resin, glycidyl ether epoxy resin, vinyl ether, unsaturated polyester resin, and unsaturated acrylic resin, the monomer being one selected from the group consisting of monofunctional monomer, multifunctional monomer, phosphorous-containing monomer, epoxy monomer, vinyl ether, and cyclic ether, and the photopolymerization initiator being one selected from the group consisting of benzoin ethers, amines, diazonium salts, iodine salts, sulfonium salts, and metallocene compounds.

3. The tacking nail connection body according to claim 1, wherein the indicating member attached to the body part is extended to cover the head part.

4. A tacking pin connection body comprising:
a plurality of U-shaped tacking pins arranged in a line and connected into a unit, each tacking pin having a pair of leg parts and parallel to each other and a head part connecting the leg parts to each other; and
an indicating member attached to a surface of at least one leg part of the leg parts and extending to a surface of the head part of each of one or more tacking pins on a position displaced laterally from a central portion of the tacking pin connection body toward one side thereof, the indicating member being separable from the leg part by frictional force when an individual tacking pin having the indicating member attached is driven into a target object.

5. The tacking pin connection body according to claim 4, wherein the indicating member is made of any one selected from the group consisting of silicone rubber, silicone resin, vinyl resin, paper material, rubber material, silicone sealant, modified silicone sealant, polysulfide sealant, polyurethane sealant, butyl sealant, acrylic sealant, sealant formed of modified silicone resin having polyether containing silyl group at the end, sealant formed of vinyl polymer containing a silyl functional group at the end, sealant containing vinyl monomer having a crosslinkable silyl group and epoxy resin, sealant cross-linking polymer having a silicone group and composition having tin (IV) compounds, and rubber putty material having acrylic emulsion as a main component, and alternatively, the indicating member 70 is made of photocurable resin containing oligomer, monomer, and photopolymerization initiator, the oligomer being one selected from the group consisting of polyester acrylate, epoxy arcylate, urethane arcylate, polyether arcylate, silicone arcylate, aliphatic epoxy resin, glycidyl ether epoxy resin, vinyl ether, unsaturated polyester resin, and unsaturated acrylic resin, the monomer being one selected from the group consisting of monofunctional monomer, multifunctional monomer, phosphorous-containing monomer, epoxy monomer, vinyl ether, and cyclic ether, and the photopolymerization initiator being one selected from the group consisting of benzoin ethers, amines, diazonium salts, iodine salts, sulfonium salts, and metallocene compounds.

6. The tacking pin connection body according to claim 4, wherein the indicating member has solid particles unitarily applied thereto.

7. A tacking nail comprising:
a body part;
a head part and a tip part formed on both ends of the body part; and
an indicating member attached to a surface of the body part in a longitudinal direction of the body part, the indicating member being separable from the body part by frictional force when the body part is driven into a target object,
wherein the indicating member has solid particles unitarily applied thereto.

8. The tacking nail according to claim 7, wherein the indicating member is made of any one selected from the group consisting of silicone rubber, silicone resin, vinyl resin, paper material, rubber material, silicone sealant, modified silicone sealant, polysulfide sealant, polyurethane sealant, butyl sealant, acrylic sealant, sealant formed of modified silicone resin having polyether containing silyl group at the end, sealant formed of vinyl polymer containing a silyl functional group at the end, sealant containing vinyl monomer having a crosslinkable silyl group and epoxy resin, sealant cross-linking polymer having a silicone group and composition having tin (IV) compounds, and rubber putty material having acrylic emulsion as a main component, and alternatively, the indicating member is made of photocurable resin containing oligomer, monomer, and photopolymerization initiator, the oligomer being one selected from the group consisting of polyester acrylate, epoxy arcylate, urethane arcylate, polyether arcylate, silicone arcylate, aliphatic epoxy resin, glycidyl ether epoxy resin, vinyl ether, unsaturated polyester resin, and unsaturated acrylic resin, the monomer being one selected from the group consisting of monofunctional monomer, multifunctional monomer, phosphorous-containing monomer, epoxy monomer, vinyl ether, and cyclic ether, and the photopolymerization initiator being one selected from the group consisting of benzoin ethers, amines, diazonium salts, iodine salts, sulfonium salts, and metallocene compounds.

9. The tacking nail according to claim 7, wherein the indicating member is attached to the body part is extended to cover the head part.

10. A tacking pin comprising:
a pair of leg parts and parallel to each other;
a head part connecting the leg parts with to each other, thus forming a U-shaped tacking pin; and
an indicating member attached to a surface of at least one leg part of the leg parts and extending to a surface of the head part, the indicating member being separable from the leg part by frictional force when the tacking pin having the indicating member attached is driven into a target object,
wherein the indicating member has solid particles unitarily applied thereto.

11. The tacking pin according to claim 10, wherein the indicating member is made of any one selected from the group consisting of silicone rubber, silicone resin, vinyl resin, paper material, rubber material, silicone sealant, modified silicone sealant, polysulfide sealant, polyurethane sealant, butyl sealant, acrylic sealant, sealant formed of modified silicone resin having polyether containing silyl group at the end, sealant formed of vinyl polymer containing a silyl functional group at the end, sealant containing vinyl monomer having a crosslinkable silyl group and epoxy resin, sealant cross-linking polymer having a silicone group and composition having tin (IV) compounds, and rubber putty material having acrylic emulsion as a main component, and alternatively, the indicating member is made of photocurable resin containing oligomer, monomer, and photopolymerization initiator, the oligomer being one selected from the group consisting of polyester acrylate, epoxy arcylate, urethane arcylate, polyether arcylate, silicone arcylate, aliphatic epoxy resin, glycidyl ether epoxy resin, vinyl ether, unsaturated polyester resin, and unsaturated acrylic resin, the monomer being one selected from the group consisting of monofunctional monomer, multifunctional monomer, phosphorous-containing monomer, epoxy monomer, vinyl ether, and cyclic ether, and the photopolymerization initiator being one selected from the group consisting of benzoin ethers, amines, diazonium salts, iodine salts, sulfonium salts, and metallocene compounds.

* * * * *